350-385
OR 3,609,007
SR

United States [11] 3,609,007

| [72] | Inventor | Theodorus Hendrikus Peek<br>Emmasingel, Eindhoven, Netherlands |
|---|---|---|
| [21] | Appl. No. | 872,863 |
| [22] | Filed | Oct. 31, 1969 |
| [45] | Patented | Sept. 28, 1971 |
| [73] | Assignee | U.S. Philips Corporation<br>New York, N.Y. |
| [32] | Priority | Nov. 8, 1968 |
| [33] | | Netherlands |
| [31] | | 6815909 |

[54] DEVICE FOR CONVERTING CIRCULARLY POLARIZED RADIATION INTO PLANE-POLARIZED RADIATION
3 Claims, 1 Drawing Fig.

[52] U.S. Cl..................................... 350/150, 350/157
[51] Int. Cl....................................... G02f 1/26
[50] Field of Search............................ 350/150, 160

[56] References Cited
UNITED STATES PATENTS
3,239,671  3/1966  Buhrer .......................... 350/150
3,432,223  3/1969  Uchida.......................... 350/150

OTHER REFERENCES

Takasaki, " Photoelectric Measurement of Polarized Light by Means of an ADP Polarization Modulator. I. Photoelectric Polarimeter" J.O.S.A. Vol. 51, No. 4 (April, 1961), pp. 462–463.

Takasaki, " Photoelectric Measurement of Polarized Light by Means of an ADP Polarization Modulator. II. Photoelectric Elliptic Polarimeter" J.O.S.A. Vol. 51, No. 4 (April, 1961), p. 463

Primary Examiner—David Schonberg
Assistant Examiner—Paul R. Miller
Attorney—Frank R. Trifari ABSTRACT: A device for converting a beam of light into a plane-polarized beam having a rotating plane of polarization using a serially arranged polarizer, quarter-wave plate, a pair of electrooptic crystals having their principle planes mutually offset by 45° and modulated by voltage sources in phase quadrature, and a retroreflective element for redirecting the polarization through the electrooptic crystals and the quarter-wave plate.

PATENTED SEP 28 1971
3,609,007
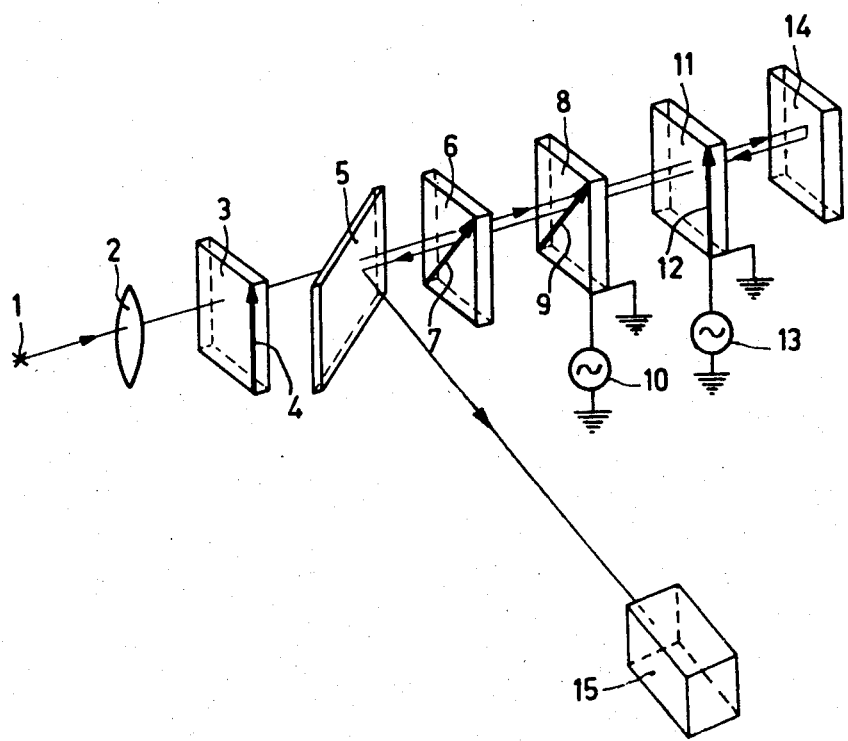
INVENTOR.
THEODORUS HENDRIKUS PEEK
BY
Frank R. ...
AGENT

DEVICE FOR CONVERTING CIRCULARLY POLARIZED RADIATION INTO PLANE-POLARIZED RADIATION

The invention relates to an improved device for converting circularly or substantially circularly polarized radiation into plane-polarized or substantially plane-polarized radiation having a plane of polarization which rotates at a constant or substantially constant angular velocity, which device includes a series arrangement of at least two electro-optical crystals, the orientations of which relative to one another and the electric voltages applied to which have been suitably chosen.

Such a device has been proposed in U.S. Pat. No. 3,558,214, issued Jan. 26, 1971. The linearity of the plane-polarized radiation emerging from the series arrangement is improved and the fluctuations of the speed of rotation of the plane of polarization of the emergent radiation are proportionally reduced as the number of electro-optical crystals is increased. Accordingly, the device shown in FIG. 2 of the said patent which includes a series arrangement of three electro-optical crystals, is more satisfactory than that shown in FIG. 1 of the said patent, which includes two crystals. As has been mentioned in the said patent, still better results are obtained when the number of crystals is greater than three.

A disadvantage of the device shown in FIG. 2 of the said patent is that three crystals are required instead of two and that comparatively high electric voltages must be used. The amplitude of the voltage set up at the inner crystal is twice that of the voltages set up at the outer crystals.

It is an object of the present invention to provide an improved device according to the said patent. The improvement, is that the series arrangement is followed by a retrodirective element so that the radiation emerging from the series arrangement after reflection traverses the series arrangement in the opposite direction.

The invention will be illustrated with reference to the accompanying drawing, which shows, by way of example only, an embodiment of a device according to the invention.

Referring now to the drawing, natural radiation emitted by a source of radiation 1 is collimated by a lens 2 and converted by a polarizer 3 into parallel plane-polarized rays. For simplicity only one ray of the beam of radiation has been drawn. After passing through a half-silvered mirror 5 the plane-polarized beam impinges on a λ/4 plate 6. The principal direction of the λ/4 plate, which direction is indicated by an arrow 7, is at an angle of 45° to the direction of transmission of the polarizer 3, which direction is indicated by an arrow 4. Hence, the radiation emerging from the λ/4 plate 6 is circularly polarized. This radiation passes through the series arrangement of two electro-optical crystals 8 and 11 which exhibit the Pockels effect and the principal directions of which, indicated by arrows 9 and 12, are at an angle of 45° to each other.

An alternating voltage $V_1 = V_o \sin \omega t$ from an alternating-voltage source 10 is applied to the crystal 8 and an alternating voltage $V_2 = V_o \cos \omega t$ from an alternating-voltage source 13 is applied to the crystal 11. As an alternative, a single source may be used, a phase-shifting network being included in the lead between the source and one of the crystals. The voltages $V_1$ and $V_2$ are applied so that the field strengths produced by them in the crystals 8 and 11 respectively are parallel to the direction of propagation of the radiation in the respective crystal. The radiation emerging from the crystal 11 is reflected at a plane mirror 14. The radiation then traverses the crystals 11 and 8 in the opposite direction and is directed by the half-silvered mirror 5 onto a photoelectric detector system 15. In the drawing, the beam reflected at the mirror 14 is represented by a single ray which for the sake of clarity has been displaced relatively to the ray incident on the mirror 14.

The amplitude $V_o$ of the voltage applied to the crystals 8 and 11 is such that circularly polarized radiation falling on the crystals 8 and 11 respectively would be converted into plane-polarized radiation at a voltage equal to $2 V_o$.

Since the birefringence of an anisotropic element, especially of an electro-optical crystal, adds linearly after reflection of the radiation traversing the element, each of the crystals 8 and 11 together with its mirror image due to the reflector 14 may effectively be regarded as a single crystal.

The device shown has the same properties as that in FIG. 2 of the aforementioned patent for the crystal 8 in the drawing of the present application corresponds with the crystal 25 of the said FIG. 2, the crystal 11 together with its mirror image corresponds to the crystal 26, and the mirror image of the crystal 8 corresponds to the crystal 27.

However, the amplitude of the voltage set up at the crystal 11 is only half that set up at the crystal 26. Moreover, the phases of the alternating voltages applied to the crystal 8 and to its mirror image automatically are identical. Consequently, there will be no adjusting difficulties.

In an embodiment in which the crystals 8 and 11 were made of potassium dideuterium phosphate (KDP) $V_o$ was 2 kv. The wavelength λ of the radiation was 6.328 AU.

Obviously, a device as described in the aforementioned patent and including $(2n-1)$ crystals $(n \geq 2)$ may be replaced by a device including $n$ crystals followed by a retrodirective element.

The retrodirective element need not be a plane mirror, but may also e a cat's eye. A cat's eye comprises a lens and a plane or concave mirror located in the focal plane of the lens.

What is claimed is:

1. A device for converting circularly polarized radiation into plane-polarized radiation having a rotating plane of polarization, comprising a first electro-optic crystal, a second electro-optic crystal, the principle direction of the second electro-optic crystal offset by an angle of approximately 45° with respect to the principle direction of the first electro-optic crystal, means for applying separate modulating voltages in phase-quadrature to the electro-optic crystals, each of the voltages having an amplitude equal to one-half of the amplitude necessary to convert a circularly polarized beam into plane-polarized radiation, and a reflector, the electro-optic crystals and the reflector being aligned to receive a beam of circularly polarized radiation successively passing through the first electro-optic crystal the second electro-optic crystal and reflected back through the two electro-optic crystals in reverse order by the reflector.

2. A device for producing rotating plane-polarized radiation, comprising means for directing radiation along a linear path, a polarizer in the path of the linear radiation for producing a plane-polarized beam having the same path, a quarter-wave plate having a principle axis offset 45° with respect to the principle axis of the polarizer and placed in the polarized beam for producing circularly polarized radiation, a first electro-optic modulator in the path of the circularly polarized radiation, a second electro-optic modulator in the path of the radiation passing through the first electro-optic modulator, the first and second electro-optic modulators having principle directions offset by an angle of approximately 45°, means for providing the electro-optic modulators with voltages in phase quadrature and having an amplitude equal to one-half the amplitude necessary for the production of rotating plane-polarized radiation, and a reflector in the path of the radiation passing through the second electro-optic modulator for reflecting that radiation back through the second electro-optic modulator the first electro-optic modulator and the quarter-wave plate.

3. A device as claimed in claim 2, further comprising a beam splitter in the path of the radiation and positioned between the polarizer and the quarter-wave plate for directing the rotating plane-polarized radiation along a path removed from the polarizer.